United States Patent
Utoh et al.

(10) Patent No.: US 8,913,262 B2
(45) Date of Patent: Dec. 16, 2014

(54) IMAGE FORMING APPARATUS, POWER CONTROL METHOD, AND STORAGE MEDIUM

(71) Applicants: Yohsuke Utoh, Yokohama (JP); Takashi Soyama, Ebina (JP); Mina Tsukahara, Kawasaki (JP)

(72) Inventors: Yohsuke Utoh, Yokohama (JP); Takashi Soyama, Ebina (JP); Mina Tsukahara, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 38 days.

(21) Appl. No.: 13/682,473

(22) Filed: Nov. 20, 2012

(65) Prior Publication Data

US 2013/0128299 A1 May 23, 2013

(30) Foreign Application Priority Data

Nov. 21, 2011 (JP) ................................. 2011-254416

(51) Int. Cl.
G06K 15/00 (2006.01)
G06F 3/12 (2006.01)
G03G 15/00 (2006.01)

(52) U.S. Cl.
CPC .......... *G06K 15/4055* (2013.01); *G06K 15/005* (2013.01); *G03G 15/502* (2013.01)
USPC ........ 358/1.13; 358/1.14; 358/1.15; 358/1.16

(58) Field of Classification Search
None
See application file for complete search history.

(56) References Cited

U.S. PATENT DOCUMENTS

| | | | | |
|---|---|---|---|---|
| 2010/0033748 A1* | 2/2010 | Enami et al. | ................ | 358/1.13 |
| 2010/0202018 A1* | 8/2010 | Akiyama et al. | ............. | 358/1.15 |
| 2010/0225970 A1* | 9/2010 | Iwashima | ................... | 358/1.16 |
| 2010/0315665 A1* | 12/2010 | Ebisui | ........................ | 358/1.14 |
| 2011/0317189 A1 | 12/2011 | Utoh | | |
| 2012/0151230 A1 | 6/2012 | Utoh | | |

FOREIGN PATENT DOCUMENTS

| | | |
|---|---|---|
| JP | 11-126000 | 5/1999 |
| JP | 2008-278106 | 11/2008 |

OTHER PUBLICATIONS

U.S. Appl. No. 13/684,907, filed Nov. 26, 2012, Tsukahara, et al.

* cited by examiner

*Primary Examiner* — Benny Q Tieu
*Assistant Examiner* — Haris Sabah
(74) *Attorney, Agent, or Firm* — Oblon, Spivak, McClelland, Maier & Neustadt, L.L.P.

(57) ABSTRACT

An image forming apparatus configured to execute image forming process by using hardware resources. The image forming apparatus includes a processor that executes application software including an image forming process, the application software causing display of one or more display screens. The image forming apparatus includes a display processing unit configured to display one of the one or more display screens on a display, a memory configured to store in association with each display screen, a power status indicating whether each of the hardware resources should be provided power during display of the display screen, a power status determining unit configured to determine which hardware resource should be provided power among the hardware resources, based on the displayed display screen and the power status stored in the memory, and a power control unit configured to provide power to the determined hardware resources.

6 Claims, 9 Drawing Sheets

| DISPLAY SCREEN | SCANNER | PLOTTER | PERIPHERAL DEVICE |
|---|---|---|---|
| SCREEN 1 OF COPY APPLICATION | ON | ON | ON |
| SCREEN 2 OF COPY APPLICATION | ON | ON | OFF |
| SCREEN 3 OF SCANNER APPLICATION | ON | OFF | OFF |
| SCREEN 4 OF SCANNER APPLICATION | ON | OFF | OFF |
| ⋮ | ⋮ | ⋮ | ⋮ |

| DISPLAY SCREEN | USER ID | SCANNER | PLOTTER | PERIPHERAL DEVICE |
|---|---|---|---|---|
| SCREEN 1 OF COPY APPLICATION | COMMON | ON | ON | ON |
| | 001 | ON | ON | ON |
| | 002 | | | |
| | ... | | | |
| SCREEN 2 OF COPY APPLICATION | COMMON | ON | ON | OFF |
| | 001 | ON | OFF | OFF |
| | ... | | | |
| SCREEN 5 OF FAX APPLICATION | COMMON | | | |
| | 001 | | | |
| | ... | | | |
| ... | ... | | | |

FIG. 8

| DISPLAY SCREEN | USER ID | OPERATING TIME OF SCANNER | OPERATING TIME OF PLOTTER | OPERATING TIME OF PERIPHERAL DEVICE | OPERATING TIME OF ALL DEVICES |
|---|---|---|---|---|---|
| SCREEN 1 OF COPY APPLICATION | 001 | 10 SECONDS | 150 SECONDS | 20 SECONDS | 180 SECONDS |
| | 002 | | | | |
| | ... | | | | |
| | TOTAL | 30 SECONDS | 420 SECONDS | 50 SECONDS | 500 SECONDS |
| SCREEN 2 OF COPY APPLICATION | 001 | 10 SECONDS | 40 SECONDS | 0 SECONDS | 50 SECONDS |
| | ... | | | | |
| | TOTAL | | | | 350 SECONDS |
| ... | | | | | |

IMAGE FORMING APPARATUS, POWER CONTROL METHOD, AND STORAGE MEDIUM

CROSS-REFERENCE TO RELATED APPLICATIONS

The present application claims priority under 35 U.S.C. §119(a) to, and incorporates by reference, the entire contents of Japanese Patent Application No. 2011-254416 filed in Japan on Nov. 21, 2011.

BACKGROUND

Japanese Patent Application Laid-open No. 2008-278106 describes an image forming apparatus which includes a power control function.

In this image forming apparatus, before shifting a power mode of the image forming apparatus from a normal mode to an energy saving mode, the image forming apparatus stores a status of applications installed in the image forming apparatus.

Furthermore, when the image forming apparatus shifts the power mode from the energy saving mode to the normal mode, the image forming apparatus controls the power of the image forming apparatus based on the stored status.

SUMMARY

Aspects of this disclosure relate to image forming apparatuses, device, processes, algorithms and systems.

An image forming apparatus includes hardware resources, a processor, application software executed by the processor and configured to perform an image forming process, the application software causing one or more display screens to be displayed, a display processing unit configured to display one of the one or more display screens on a display, a power status storing unit configured to store, in association with each display screen, a power status indicating whether the hardware resource should be provided power during display of the display screen, a power status determining unit configured to determine which hardware resource should be provided power among the hardware resources, based on the display of the display screen and the power status stored by the power status storing unit, and a power control unit configured to provide power to the determined hardware resources.

A power control method on an image forming apparatus includes displaying one display screen of one or more display screens on a display of the image forming apparatus, the one or more display screens being displayed by application software installed in the image forming apparatus, determining which hardware resources should be provided power among the hardware resources, based on the displayed display screen and a power status, the power status being stored in association with each display screen and indicating whether the hardware resource should be provided power during display of the display screen, and providing power to the determined hardware resources.

According to another embodiment, there is provided a non-transitory computer readable medium having stored thereon a program that, when executed by an image forming apparatus, can cause the image forming apparatus to implement a power control method. The power control method on an image forming apparatus includes displaying one display screen of one or more display screens on a display of the image forming apparatus, the one or more display screens being displayed by application software installed in the image forming apparatus, determining which hardware resources should be provided power among the hardware resources, based on the displayed display screen and a power status, the power status being stored in association with each display screen and indicating whether the hardware resource should be provided power during display of the display screen, and providing power to the determined hardware resource.

The foregoing paragraphs have been provided by way of general introduction, and are not intended to limit the scope of the following claims. The described exemplary implementations, together with further advantages, will be best understood by reference to the following detailed description taken in conjunction with the accompanying drawings, wherein like reference numerals designate identical or corresponding parts throughout the several views.

BRIEF DESCRIPTION OF THE DRAWINGS

FIG. 7 is a table indicating a status of the power supply of the image forming apparatus;

FIG. 8 is a table indicating operation time;

DETAILED DESCRIPTION

Hereinafter, exemplary implementations will be described with reference to the accompanying drawings. However, variations and modifications may be made without departing from the basic concepts described herein.

In an image forming apparatus, the image forming apparatus can control power of the image forming apparatus.

In a conventional image forming apparatus, when the image forming apparatus shifts the power mode from the energy saving mode to the normal mode, the image forming apparatus controls power-on and power-off of image forming devices included in the image forming apparatus based on the stored status of an application.

However, even if the state of the application is the same, the same devices are not always used.

Thus, in the conventional image forming apparatus, if a device that is not used exists, power is wasted.

In an image forming apparatus according to aspects of this disclosure, the image forming apparatus is able to reduce power consumption.

Figure 10:
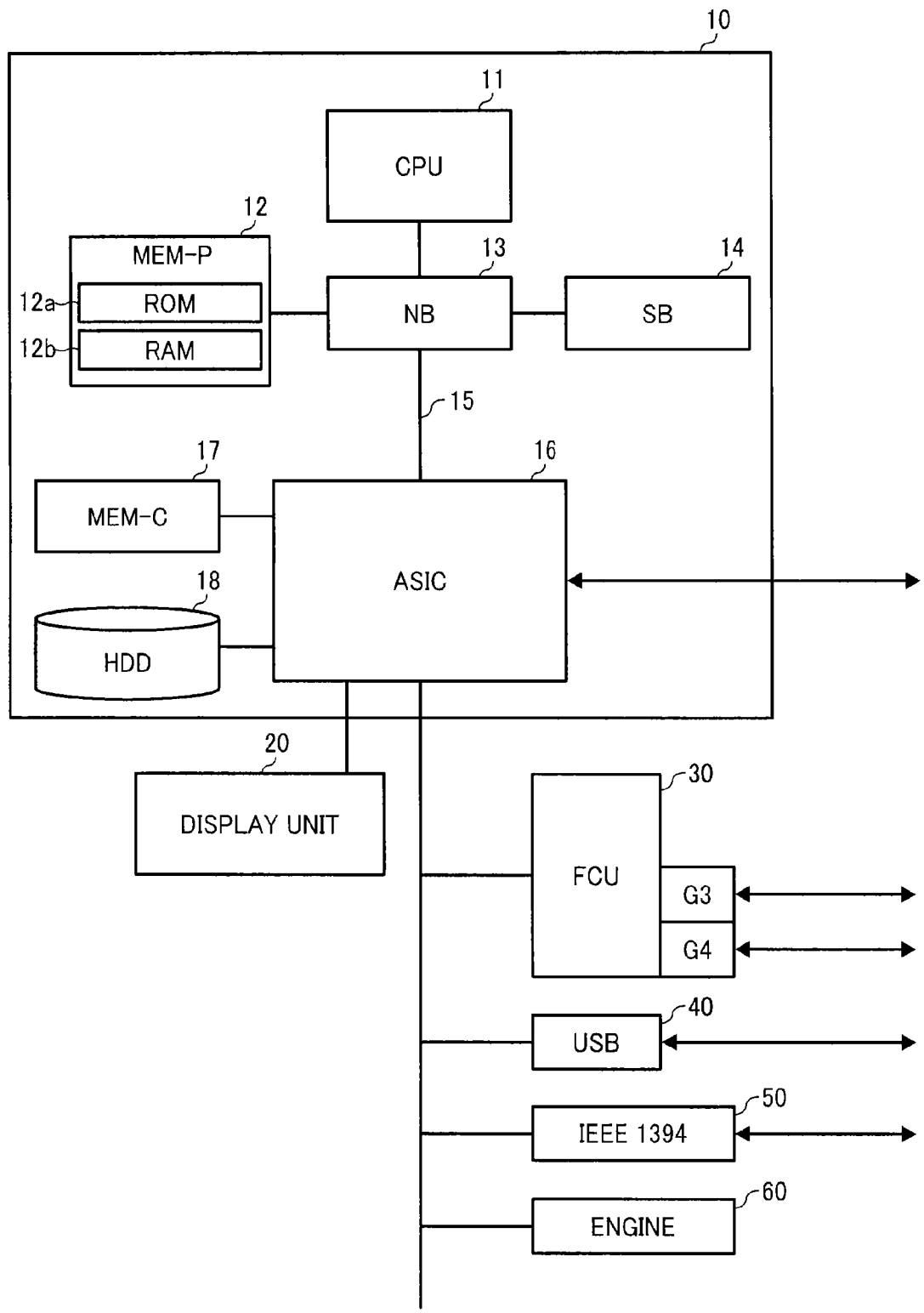
FIG. 10 is a block diagram of a hardware configuration of an image forming apparatus.

FIG. 10 is a block diagram of an exemplary hardware configuration of the image forming apparatus 1.

As illustrated in FIG. 10, the image forming apparatus 1 includes a controller 10 and an engine 60, which are mutually connected to each other by a Peripheral Component Interface (PCI) bus.

The controller 10 controls a main process of the image forming apparatus 1, a drawing process, a communication process, and an input process.

The engine 60 includes, for example, a printer engine, a plotter, a scanner, and a fax unit. Further, the engine 60 further includes an image processing part which performs error diffusion or gamma conversion.

The controller 10 includes a central processing unit (CPU) 11, a Northbridge (NB) 13, a system memory (MEM-P) 12, a Southbridge (SB) 14, a local memory (MEM-C) 17, an application specific integrated circuit (ASIC) 16, and a hard disk drive (HDD) 18.

The NB 13 is connected the ASIC 16 via an accelerated graphics port (AGP) bus 15. Further, the NB 13 is a bridge to connect the CPU 11, the MEM-P 12, the SB 14, and the AGP 15. Further, the NB 13 includes a memory controller to control input and output to the MEM-P 12, and further includes PCI master and an AGP target.

The MEM-P 12 includes a read only memory (ROM) 12a and a random access memory (RAM) 12b. The ROM 12a is a read only memory to store programs and data. The RAM 12b is able to read and write, and is used as an expanding memory to expand the programs and the data, and as a drawing memory.

The SB 14 is a bridge to connect the NB 13, a PCI device, and a peripheral device. The SB 14 is connected to the NB 13 via a PCI bus. The PCI bus is able to connect to a network interface.

The ASIC 16 is an integrated circuit that processes an image. The ASIC 16 is a bridge to connect the AGP 15, the PCI bus, the HDD 18, and the MEM-C 17. Further, the ASIC 16 includes a PCI target, an AGP master, an arbiter, a memory controller for controlling the MEM-C 17, a plurality of direct memory access controllers (DMAC), and a PCI unit for sending data to the engine 60 via the PCI bus.

The ASIC 16 is connected to a facsimile control unit (FCU) 30, an universal serial bus (USB) 40, and an IEEE 1394 interface 50.

The MEM-C 17 is a local memory to be used as buffer. The HDD 18 is a storage device to store image data, program, font data, and a form.

The AGP 15 is a bus interface to speed up a process of graphics.

Figure 1:
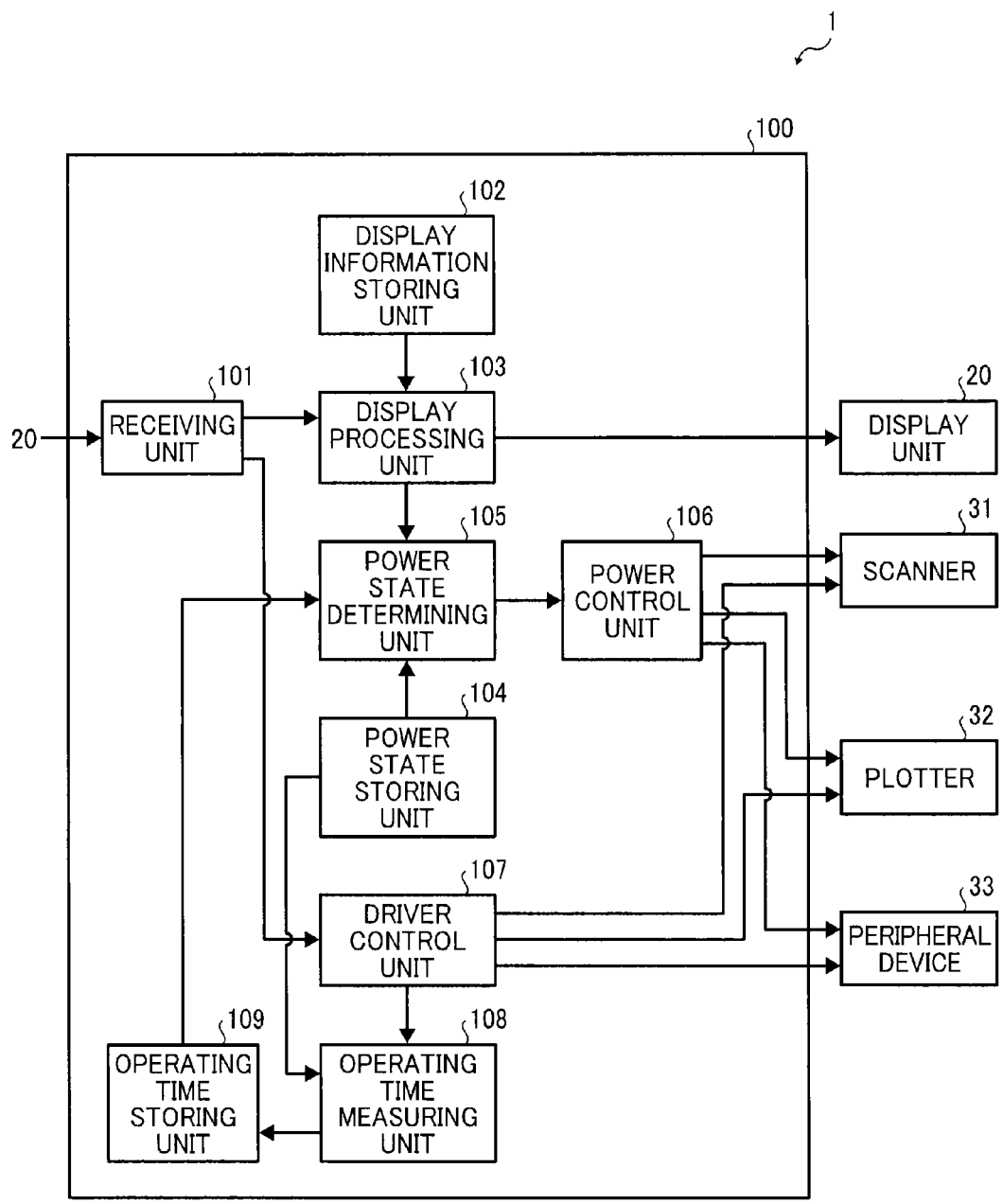
FIG. 1 is a diagram illustrating a functional configuration of the image forming apparatus.

FIG. 1 is a diagram illustrating a functional configuration of the image forming apparatus 1.

As illustrated in FIG. 1, the image forming apparatus 1 includes an energy saving processing unit 100, a display unit 20, a scanner 31, a plotter 32, and a peripheral device 33.

In response to input by a user, the image forming apparatus 1 shifts an operation status from normal status to energy saving status. The normal status is a status in which the image forming apparatus 1 provides power to all hardware units.

The energy saving status is a status in which the image forming apparatus 1 stops power to some of the hardware units. Power consumption in the energy saving status is less than power consumption in the normal status.

The energy saving processing unit 100 controls the supplying of power to each hardware unit.

The energy saving processing unit 100 includes a receiving unit 101, a display information storing unit 102, a display processing unit 103, a power status storing unit 104, a power status determining unit 105, a power control unit 106, a driver control unit 107, an operating time measuring unit 108, and an operating time storing unit 109.

The receiving unit 101 receives input of information from a user. The information includes, for example, a display instruction to display on the display unit 20, a screen to be displayed by an application, or an execution instruction to execute a function.

The display information storing unit 102 stores display information to be displayed on the display unit 20 by an application to be executed on the image forming apparatus 1.

The display processing unit 103, in response to receiving a display instruction by a user, extracts display information corresponding to the display instruction among the display information stored by the display information storing unit 102. Further, the display processing unit 103 displays a screen on the display unit 20 based on the extracted display information.

The power status storing unit 104 stores power status information to determine a power status of each device. The power status information will be described below.

Figure 2:
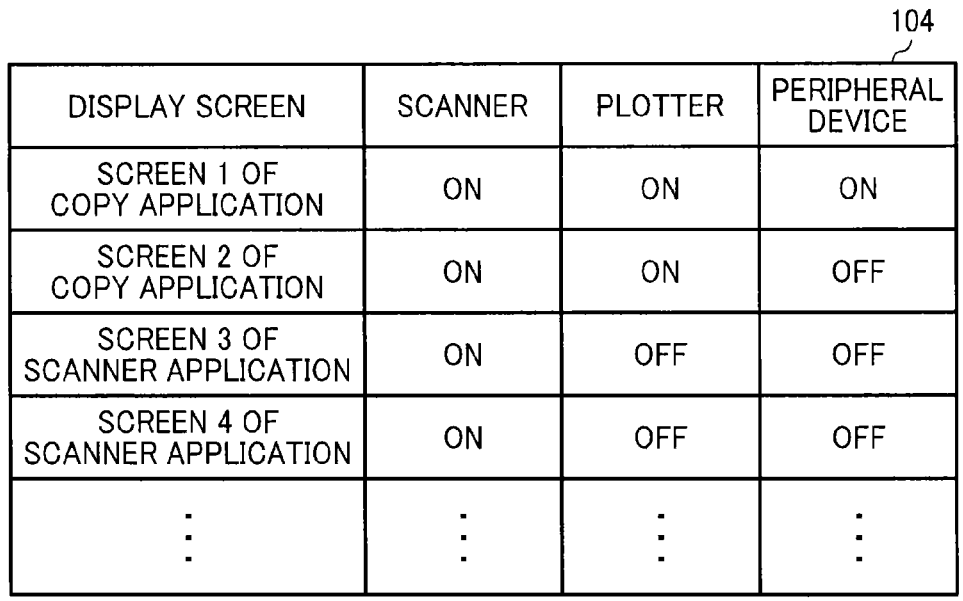
FIG. 2 is a table indicating power status information.

FIG. 2 is a table indicating the power status information.

As illustrated in FIG. 2, the power status storing unit 104 stores a display screen to be displayed on the display unit 20 and a corresponding power status of each device.

Herein, the display screen is a display screen displayed on the display unit 20 by an application. When one application displays a plurality of display screens, the power status storing unit 104 stores each of the plurality of display screens. The power status is information indicating power to be supplied to each device.

During execution of an application, the display processing unit 103 displays a display screen on the display unit 20 based on the application. Further, the receiving unit 101 is able to receive from a user, on the display screen, an execution instruction to execute a function. That is to say, even while an application is executed, it is possible to execute a different function, and it is possible to use different devices.

In this description, the power status storing unit 104 stores display screens and the power status of devices corresponding with them. In detail, the power status storing unit 104 stores, corresponding to every display screen of application, a power-on status of a device or a power-off status of a device.

For example, the power status storing unit 104 stores statuses, which are scanner ON, plotter ON, and peripheral device ON, corresponding to screen 1 of a copy application.

In another example, the power status storing unit 104 stores statuses, which are scanner ON, plotter ON, and peripheral device OFF, corresponding to screen 2 of the copy application.

In this way, the power status storing unit 104 is able to store the power status of devices for every screen of an application.

Return to the FIG. 1, the power status determining unit 105 determines the power status of a device based on a display screen displayed on the display unit 20 and information stored by the power status storing unit or the operation time storing unit 109.

The power control unit 106 controls, based on the power status determined by the power status determining unit 105, power supplying to the scanner 31, the plotter 32, and the peripheral device 33.

When the receiving unit 101 receives an execution instruction while a display screen is displayed by the display processing unit 103, the driver control unit 107 determines a driver to execute a function based on the execution instruction. Further, the driver control unit 107 controls the determined driver to execute a process of the function.

The operating time measuring unit 108 measures an operating time of the driver. The operation time storing unit 109 stores the measured operation time corresponding to the display screen that is displayed on the display unit 20.

Figure 3:
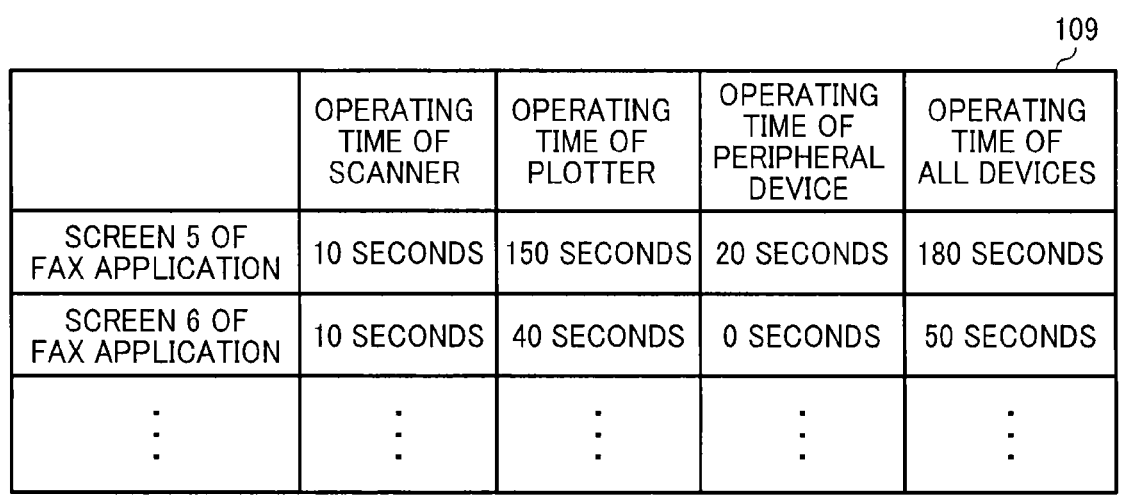
FIG. 3 is a table indicating operation time.

FIG. 3 is a table indicating operation time.

As illustrated in FIG. 3, the operation time storing unit 109 stores, in association with one another, a display screen displayed on the display unit 20, operation time of each device, and operation time of all devices.

The operation time of each device is the operation time that is measured during display of the display screen on the display unit 20.

The operation time of all devices is the total time of the operation time of each device.

A detailed process of controlling of power supply to each device will be described below with reference with a flowchart.

Figure 4:
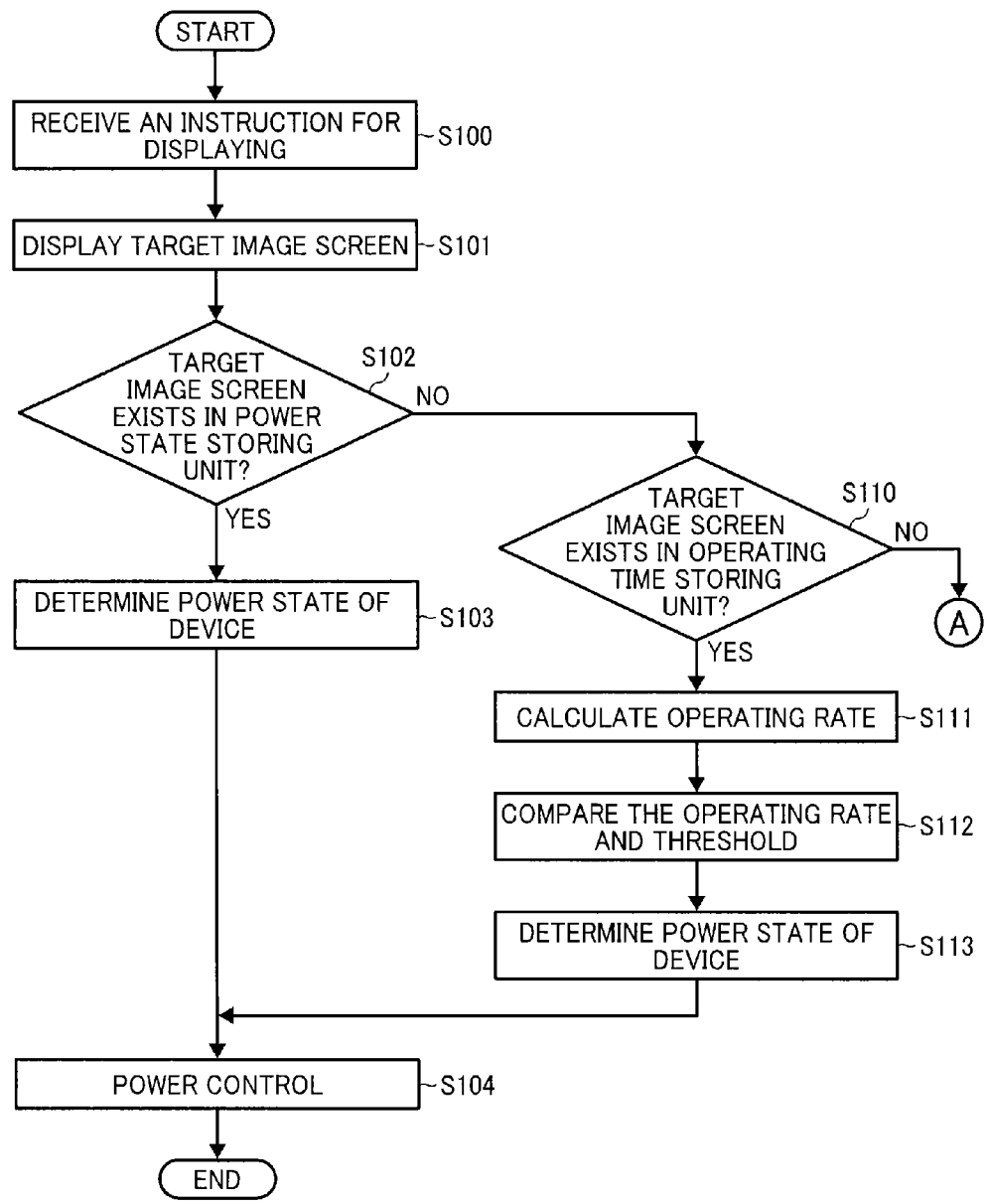
FIG. 4 is a flowchart illustrating a procedure for controlling the power supply of the image forming apparatus.
Figure 5:
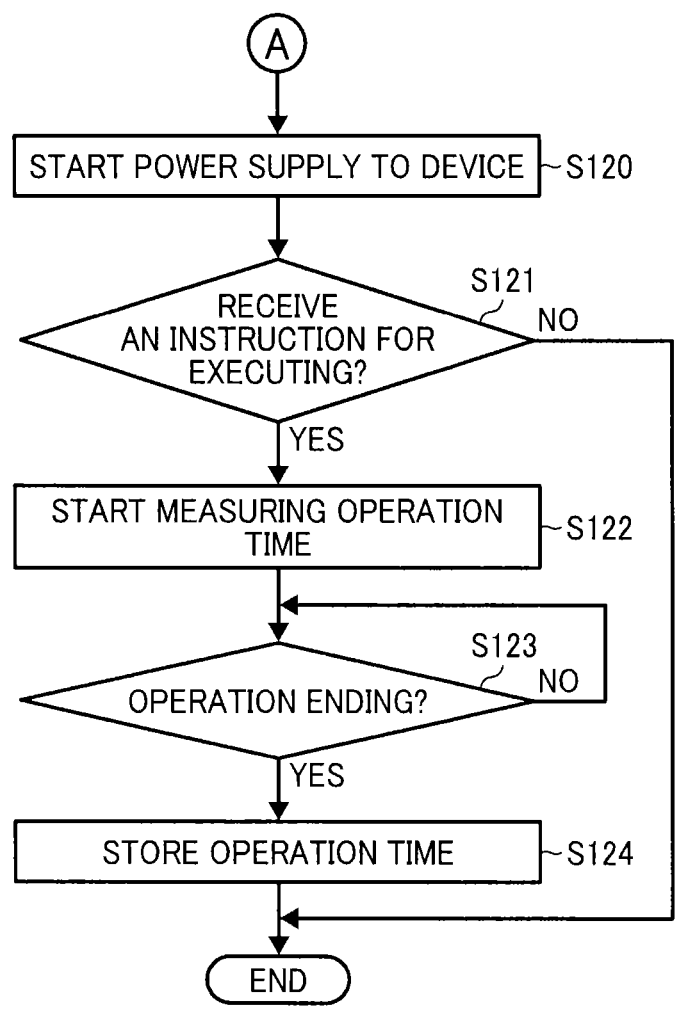
FIG. 5 is a flowchart illustrating a procedure for controlling the power supply of the image forming apparatus.

FIG. 4 and FIG. 5 are a flowchart illustrating a procedure for controlling of power supply of the image forming apparatus.

As illustrated in FIG. 4, the receiving unit 101 receives a display instruction input from a user (step S100).

Next, in response to receiving the display instruction, the display processing unit 103 displays a display screen on the display unit 20 based on the display instruction (step S101).

Next, in response to displaying the display screen on the display unit 20, the power status determining unit 105 determines whether the displayed display screen is stored in the power status storing unit 104 or not (step S102).

Next, when the power status determining unit 105 determines that the displayed display screen is stored in the power status storing unit 104 (step S102: YES), the power status determining unit 105 determines the power status of each device associated with the displayed display screen (step S103).

Next, the power control unit 106 controls power supplying to each device based on the determined power status (step S104).

As shown in FIG. 2, when screen 1 of copy application is displayed, the power control unit 106 supplies power to the scanner 31, the plotter 32, and the peripheral 33.

Thus, for the image forming apparatus 1 described herein, even while the same application is executed, the image forming apparatus 1 is able to variably control power supplying to each device. Thus, the image forming apparatus 1 is able to save power by not supplying power to a device that will not be used during display of the display screen.

Next, when the power status determining unit 105 determines that the displayed display screen is not stored in the power status storing unit 104 (step S102: NO), the power status determining unit 105 determines whether the displayed display screen is stored in the operating time storing unit 109 or not (step S110).

Next, when the power status determining unit 105 determines that the displayed display screen is stored in the operation time storing unit 109 (step S110: YES), the power status determining unit 105 extracts the operation time of each device and the operation time of all devices, which are associated with the displayed display screen. Further, the power status determining unit 105 calculates an operating rate of the operation time of each device to the operation time of all devices (step S111).

Next, the power status determining unit 105 compares the calculated operating time to a predetermined threshold (step S112).

Next, the power status determining unit 105 determines the power status of each device based on a result of comparison (step S113).

In detail, when the calculated power operating time of a device is more than the predetermined threshold, the power status determining unit 105 determines that power status of the device indicates power on. Further, when the calculated power operating time of a device is less than the predetermined threshold, the power status determining unit 105 determines that power status of the device indicates power off.

In FIG. 3, for screen 6 of the fax application, the operation rate of the scanner 31 is 20 percent, the operation rate of the plotter 32 is 80 percent, and operation rate of the peripheral device is 0 percent. Further, when the predetermined threshold is 30 percent, power status of the plotter 32 is determined as power on, and power statuses of the scanner 31 and peripheral device 33 are both determined as power off. Thus, the result of the determination is that only the plotter 32 will be provided power.

Next, when the power status determining unit 105 determines that the displayed display screen is not stored in the operation time storing unit 109 (step S110: NO), the procedure goes to S120 of FIG. 5.

As illustrated in FIG. 5, when the power status determining unit 105 determines that the displayed display screen is not stored in the operation time storing unit 109 (step S110: NO), the driver control unit 107 supplies power to all devices. In detail, the driver control unit 107 supplies power to the scanner 31, the plotter 32, and the peripheral device 33.

Next, in response to receiving an execution instruction by the receiving unit 101 (step S121: YES), the driver control unit 107 determines a driver to execute function based on the execution instruction, and controls each driver to execute the function.

Next, the operation time measuring unit 108 starts measuring an operation time of each device (step S122).

Next, when the process of each device is finished (step S123: YES), the operation time measuring unit 108 stores the operating time in the operating time storing unit 109 associated with a display screen that is displayed when the execution instruction is received (step S124). Further, when the operating time storing unit 109 has already stored an operation time, the operating time storing unit 109 stores the measured operation time in addition to the stored operation time.

In this way, when an application that is not stored in the power status storing unit 104 is executed, the image forming apparatus 1 is able to determine a power status by executing from the process of S111 to the process of S104.

For example, an application that is not stored in the power status storing unit 104 includes an added new application like SDK (Software Development Kit) application.

Thus, when the new application is added in this image forming apparatus 1, the image forming apparatus 1 is able to control power without prior information of the new application.

Descriptions of configurations below having reference numerals that are the same as those in the above description are omitted unless there is a special necessity.

The image forming apparatus 1 is able to control power supplied to each device based on information from a user.

Figure 6:
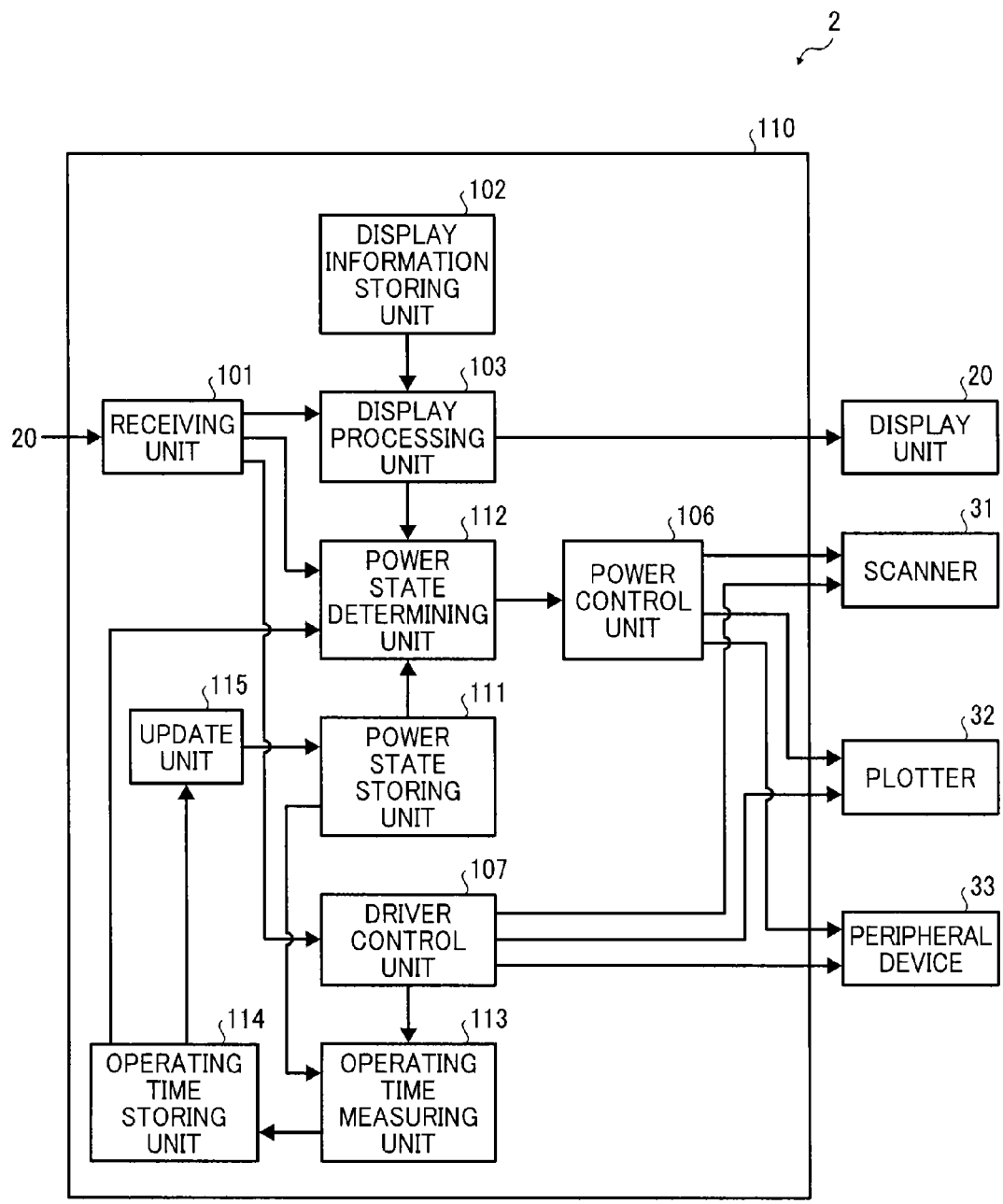
FIG. 6 is a diagram illustrating a functional configuration of the image forming apparatus.

FIG. 6 is a diagram illustrating a functional configuration of the image forming apparatus 2.

As illustrated in FIG. 6, the image forming apparatus 2 includes the energy saving processing unit 110, the display unit 20, the scanner 31, the plotter 32, and the peripheral device 33.

The energy saving processing unit 110 includes the input unit 101, the display information 102, the display processing unit 103, the power control unit 106, the driver control unit 107, a power state determining unit 112, a power state storing unit 111, an operating time measuring unit 113, an operating time storing unit 114, and an update unit 115.

The power state storing unit 111 stores power status information of each device corresponding to each user. The power status information will be described below.

FIG. 7 is a table indicating the power status information.

As illustrated in FIG. 7, the power state storing unit 111 stores, associated with each display screen, a user ID for identifying a user, and power status of each device.

Further, the user ID includes a shared ID that does not identify a user.

Returning to the FIG. 6, when the receiving unit 101 receives a display instruction together with a user ID, the power state determining unit 112 determines the power status of each device by referring the power state storing unit 111 or the operating time storing unit 114.

The operating time measuring unit 113 measures an operation time of a device. Further, the operating time measuring unit 113 stores the measured operation time in the operation time storing unit 114 corresponding to a display screen that is displayed on the display unit 20.

FIG. 8 is a table indicating operation time. As illustrated in FIG. 8, the operation time storing unit 114 stores an operation time of scanner, an operation time of plotter, an operation time of peripheral device, and an operating time of all devices corresponding to a display screen.

In FIG. 6, an update unit 115 updates power status stored in the power state storing unit 111 by referring to the operation time storing unit 114.

Figure 9:
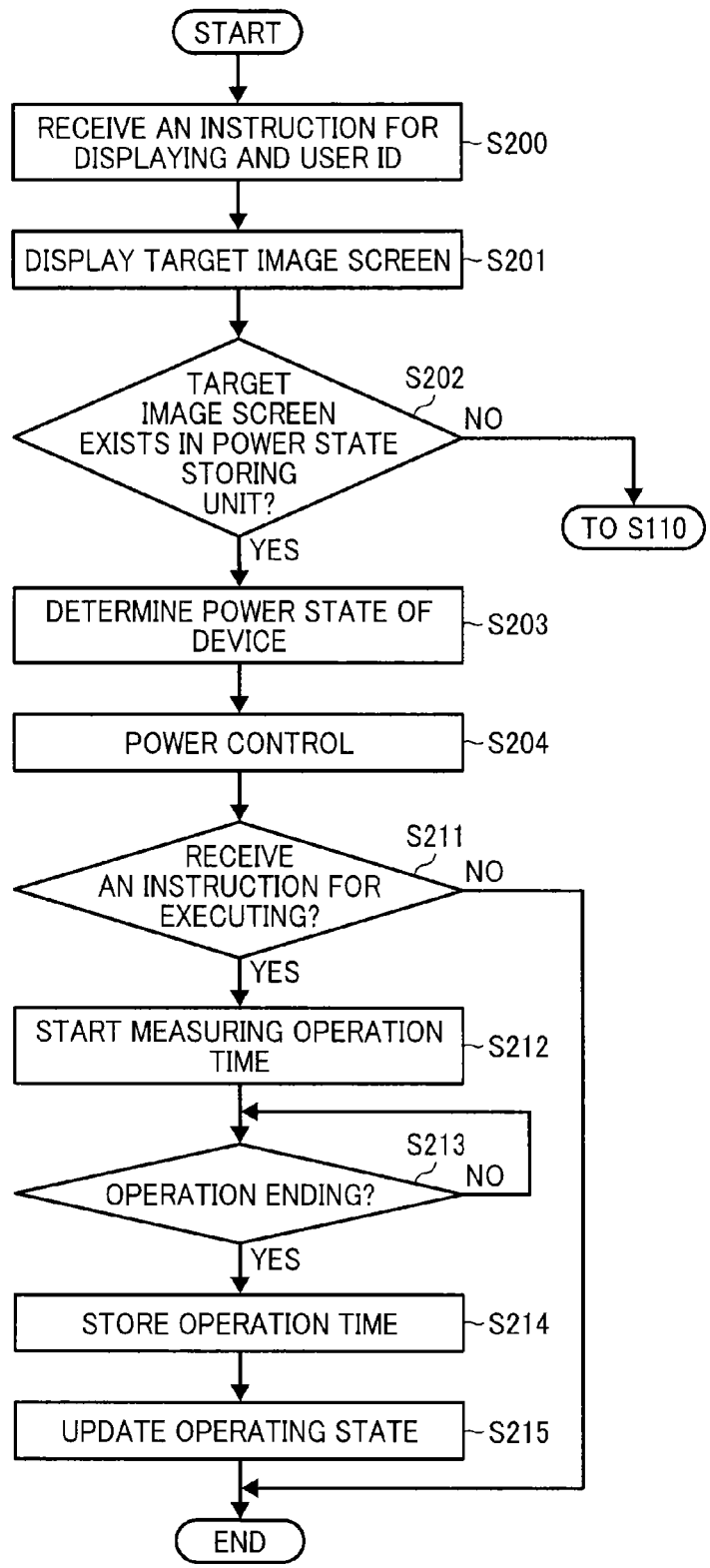
FIG. 9 is a flowchart illustrating a procedure for controlling power of the image forming apparatus.

FIG. 9 is a flowchart illustrating a procedure for the controlling of power supply of the image forming apparatus 2.

As illustrated in FIG. 9, the receiving unit 101 receives a display instruction and user ID, which are input from a user (step S200).

Next, in response to receiving the display instruction and the user ID, the display processing unit 103 displays a display screen on the display unit 20 based on the display instruction (step S201).

Next, in response to displaying the display screen on the display unit 20, the power status determining unit 112 determines whether the displayed display screen is stored in association with the received user ID in the power state storing unit 111 or not (step S202).

Next, when the power status determining unit 112 determines that the displayed display screen is stored in association with the received user ID in the power state storing unit 111 (step S202: YES), the power status determining unit 112 determines the power state of each device associated with the displayed display screen and the received user ID (step S203).

Next, the power control unit 106 controls power supplying to each device based on the determined power status (step S204).

Next, in response to receiving an execution instruction and a user ID by the receiving unit 101 (step S211: YES), the driver control unit 107 determines a driver to execute a function based on the execution instruction, and controls each driver to execute the function.

Here, when the receiving unit 101 does not receive any execution instruction (step S211: NO), the power control process is finished.

Next, the operation time measuring unit 113 starts measuring an operation time of each device (step S212).

Next, when the process of each driver is finished (step S213: YES), the operation time measuring unit 113 stores the operating time in the operating time storing unit 114 in association with user ID and a display screen that is displayed when the execution instruction is received (step S214). Further, when the operating time storing unit 114 has already stored an operation time, the operating time storing unit 114 stores the measured operation time in addition to the stored operation time.

Next, the update unit 115 updates the power status stored in the power state storing unit 111 based on the operation time stored in the operation time storing unit 114 (step S215).

In detail, the update unit 115 measures an operating rate of each device based on the operation time of each device and the operating time of all devices.

Further, when the measured operating rate is more than a predetermined threshold, the update unit 115 updates the power status of a device associated with the user ID and the displayed display screen to the status of power on.

Further, when the measured operating rate is less than the predetermined threshold, the update unit 115 updates the power status of a device associated with user ID and the displayed display screen to the status of power off.

Here, when the power status determining unit 112 determines that the displayed display screen is not stored in association with the received user ID in the power state storing unit 111 (step S202: NO), the power control process goes to step S110 of FIG. 4.

The descriptions provided herein are only exemplary, and variations and modifications may be made without departing from the concepts discussed herein.

What is claimed is:

1. An image forming apparatus, comprising:
   hardware resources;
   a processor configured to execute application software including an image forming process, the application software causing display of at least one display screen;
   a display controller configured to display one display screen of the at least one display screen on a display, the one display screen having a first identifier;
   a memory configured to store, in association with a respective identifier of each of the at least one display screen, a corresponding power status indicating whether each of the hardware resources should be provided power when the display screen is displayed,
   wherein the processor is configured to determine at least one hardware resource of the hardware resources that should be provided the power, based on the first identifier of the one display screen and the power status corresponding to the first identifier stored in the memory, and to cause the power to be supplied to the determined at least one hardware resource.

2. The image forming apparatus as claimed in claim 1, wherein, when the display screen displayed on the display is changed to another display screen among the at least one display screen, the processor is configured to determine the at least one hardware resource of the hardware resources that should be provided the power based on the changed display screen and the power status stored in the memory.

3. The image output apparatus as claimed in claim 1, wherein the processor is configured to measure an operation time of each hardware resource;
   the memory is configured to store, in association with the display screen displayed on the display, the measured operation time of each hardware resource; and
   the processor is further configured to determine the at least one hardware resource of the hardware resources that should be provided the power based on the display screen displayed on the display and the stored operation time of each hardware resource.

4. The image forming apparatus as claimed in claim 1, further comprising:
   a user interface configured to receive user information;
   wherein the memory further stores the user information in association with each display screen, and the processor is configured to determine the at least one hardware resource of the hardware resources that should be provided the power, based on the displayed one display screen and the power status stored in association with the input user information.

5. A power control method of an image forming apparatus, comprising:

displaying, on a display of the image forming apparatus, one display screen of at least one display screen, the at least one display screen having a first identifier and being displayed by application software installed in the image forming apparatus;

determining at least one hardware resource of hardware resources included in the image forming apparatus that should be provided power, based on the first identifier of the one display screen and a corresponding power status, wherein a power status is stored in association with a respective identifier of each of the at least one display screen and indicates whether each hardware resource should be provided the power during the display of the display screen; and providing the power to the determined at least one hardware resource.

6. A non-transitory computer-readable medium having stored thereon a program that, when executed by an image forming apparatus, causes the image forming apparatus to implement a method, the method comprising:

displaying, on a display of the image forming apparatus, one display screen of at least one display screen, the at least one display screen having a first identifier and being displayed by application software installed in the image forming apparatus;

determining at least one hardware resource of hardware resources included in the image forming apparatus that should be provided power, based on the first identifier of the one display screen and a corresponding power status, wherein a power status is stored in association with each of the at least one display screen and indicates whether each hardware resource should be provided the power during the display of the display screen; and providing the power to the determined at least one hardware resource.

* * * * *